Patented Sept. 19, 1939

2,173,376

UNITED STATES PATENT OFFICE 2,173,376

CATALYST

James R. Rose, Edgeworth, Pa.

No Drawing. Application April 20, 1939,
Serial No. 268,956

4 Claims. (Cl. 23—233)

This invention relates to a catalyst which has been found to be particularly advantageous in the treatment of gases resulting from the refining of crude oil for the purpose of obtaining therefrom hydrocarbon liquid polymers suitable for motor fuel.

As is well known, the different oil fields produce crude oils that differ quite widely in their content of saturates and unsaturates, with a resultant variation in the content of the gases produced by the refining of such crudes. It is particularly important, in the treatment of these gases for the purpose of obtaining liquid hydrocarbon polymers such as referred to, to be able to employ therewith a catalyst which is capable of operating efficiently on all such gases.

The catalyst described herein has been found to be particularly efficient in obtaining from gases of the character referred to a very high recovery of liquid hydrocarbon of high octane rating. It has been found further capable of effecting a polymerization of such gases without breaking down the mixture of the ingredients of which the catalyst is composed and also without material carbonization of the catalyst. The catalyst described herein has been used in the process of my application No. 200,359 of which this is a continuation in part and wherein gases resulting from the cracking of oil and containing saturates and unsaturates and small amounts of liquid hydrocarbons heavier than butane (such as pentane and pentene) are first subjected to a compressing and cooling action whereby a preliminary separation of liquid hydrocarbon from gaseous material is obtained and the liquid thus separated is delivered into a stabilizer tower and is heated to a temperature of approximately 300° F., while the gases remaining from this preliminary separation and those produced within and delivered from the stabilizer tower are liquefied under a pressure of from 800 to 1500 pounds per square inch, with suitable cooling; wherein the resultant liquid, or largely liquid, product is cracked into a gaseous condition under temperatures of from 800° to 1500° F., while under the aforesaid pressure, and is then circulated while under the aforesaid pressure and temperature through banks of catalyst receptacles charged with a catalyst containing the ingredients described herein. In the practice of my aforesaid process the resultant hydrocarbon is then conducted through receptacles wherein a separation of any gaseous products from the liquid hydrocarbon is obtained and these gases are recycled, together with the gases delivered from the stabilizer tower and from the first condensation step. The liquid hydrocarbon thus recovered is delivered into the stabilizer tower. It is not only of a very high octane rating, but is stable, whereby it can be used either with or without blending.

The particular catalyst which I employ consists of a mixture of carnotite, phosphate rock, Floridan clay, zinc phosphate and barium chloride, bonded together with commercial fire bond. A considerable variation in the proportions of the ingredients comprising my catalyst can be employed. For instance, beneficial results may be accomplished by using the ingredients in substantially the following range of proportions:—

| | Parts by weight |
|---|---|
| Natural phosphate rock | 10 to 50 |
| Floridan clay | 10 to 50 |
| Zinc phosphate | 5 to 30 |
| Barium halide (preferably chloride) | 5 to 30 |
| Fire bond | 10 to 40 |

Carnotite 25% to 100% by weight of the total weight of all other ingredients.

I have found that the best results which I have been able to obtain thus far with my catalyst have been secured where the ingredients are used in substantially the following proportions by weight:

| | Parts |
|---|---|
| Natural phosphate rock | 27 |
| Floridan clay | 27 |
| Zinc phosphate | 5 |
| Barium chloride | 4 |
| Fire bond | 10 |
| Carnotite | 27 |

In the mixture of catalytic ingredients, the Floridan clay has a filling effect, while the fire bond, being water glass, binds the whole mass together so as to prevent the same from breaking down. Both the Floridan clay and the fire bond are themselves catalytic in action; and, because of their use in combination with the other ingredients, I am enabled to produce, from crude oil refinery gases containing saturates and unsaturates, liquid hydrocarbons which are not only of a very high octane rating but which are stable, thereby enabling them to be used either with or without blending.

Attention is directed to my copending application Serial No. 222,019.

Having thus described my invention, what I claim is:

1. A catalyst suitable for use in the conversion of crude oil refinery gases containing saturates and unsaturates into hydrocarbon liquid polymers, said catalyst comprising a mixture of natural phosphate rock, zinc phosphate, barium halide, Floridan clay, fire bond and carnotite in substantially the following proportions by weight:

|  | Parts |
|---|---|
| Natural phosphate rock | 10 to 50 |
| Floridan clay | 10 to 50 |
| Zinc phosphate | 5 to 30 |
| Barium halide | 5 to 30 |
| Water glass | 10 to 40 |

Carnotite 25% to 100% by weight of the total weight of all other ingredients.

2. A catalyst suitable for use in the conversion of crude oil refinery gases containing saturates and unsaturates into hydrocarbon liquid polymers, said catalyst comprising a mixture of natural phosphate rock, zinc phosphate, barium chloride, Floridan clay, fire bond and carnotite in substantially the following proportions by weight:

|  | Parts |
|---|---|
| Natural phosphate rock | 10 to 50 |
| Floridan clay | 10 to 50 |
| Zinc phosphate | 5 to 30 |
| Barium chloride | 5 to 30 |
| Water glass | 10 to 40 |

Carnotite 25% to 100% by weight of the total weight of all other ingredients.

3. A catalyst suitable for use in the conversion of crude oil refinery gases containing saturates and unsaturates into hydrocarbon liquid polymers, said catalyst comprising a mixture of natural phosphate rock, zinc phosphate, barium halide, Floridan clay, fire bond and carnotite in substantially the following proportions by weight:

|  | Parts |
|---|---|
| Natural phosphate rock | 27 |
| Floridan clay | 27 |
| Zinc phosphate | 5 |
| Barium halide | 4 |
| Water glass | 10 |
| Carnotite | 27 |

4. A catalyst suitable for use in the conversion of crude oil refinery gases containing saturates and unsaturates into hydrocarbon liquid polymers, said catalyst comprising a mixture of natural phosphate rock, zinc phosphate, barium chloride, Floridan clay, fire bond and carnotite in substantially the following proportions by weight:

|  | Parts |
|---|---|
| Natural phosphate rock | 27 |
| Floridan clay | 27 |
| Zinc phosphate | 5 |
| Barium chloride | 4 |
| Water glass | 10 |
| Carnotite | 27 |

JAMES R. ROSE.